Nov. 18, 1952   R. V. HELLER   2,618,337
MACHINE FOR FEEDING WORK PIECES TO POWER PRESSES
Filed Feb. 5, 1948   11 Sheets-Sheet 4

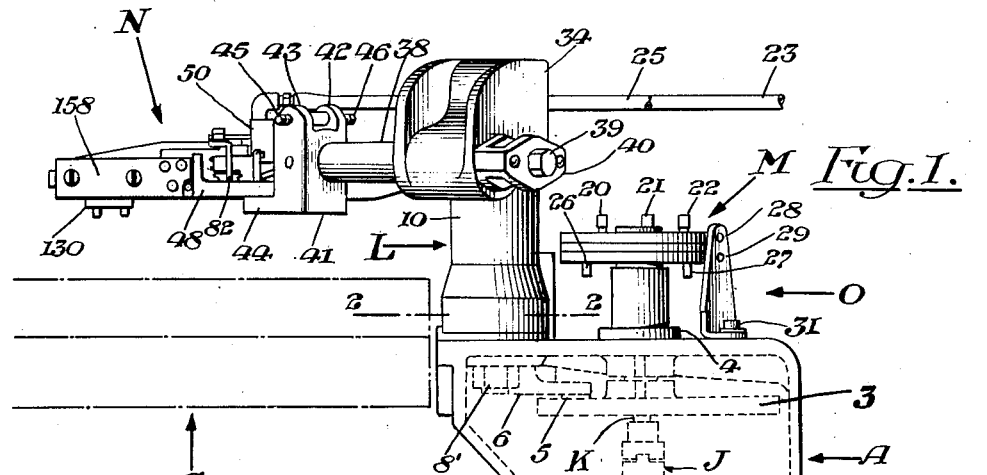
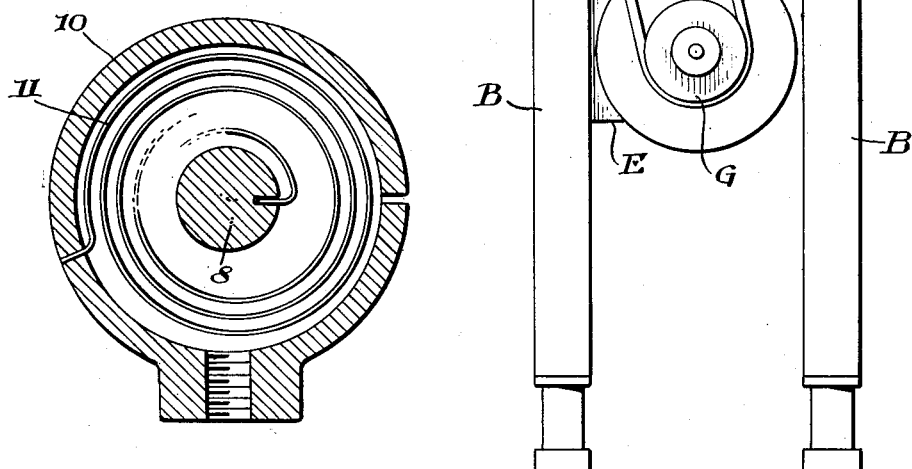

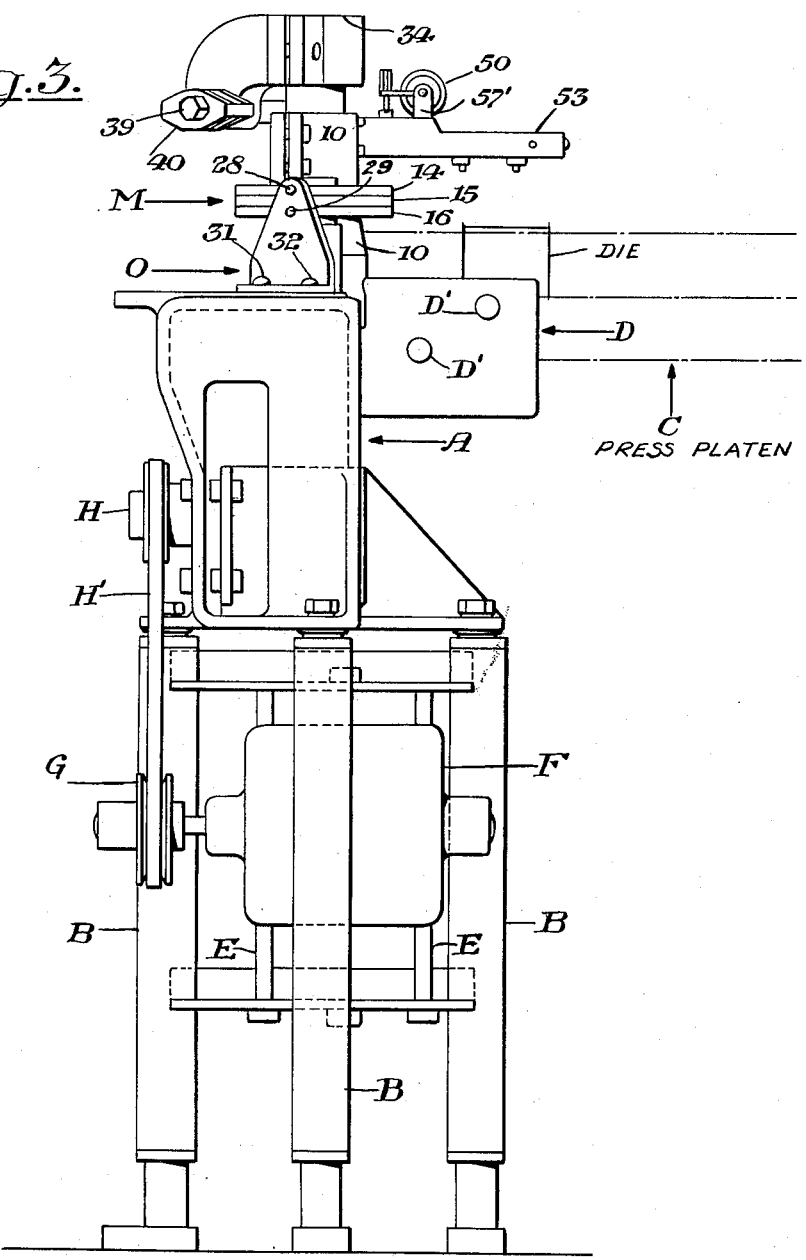

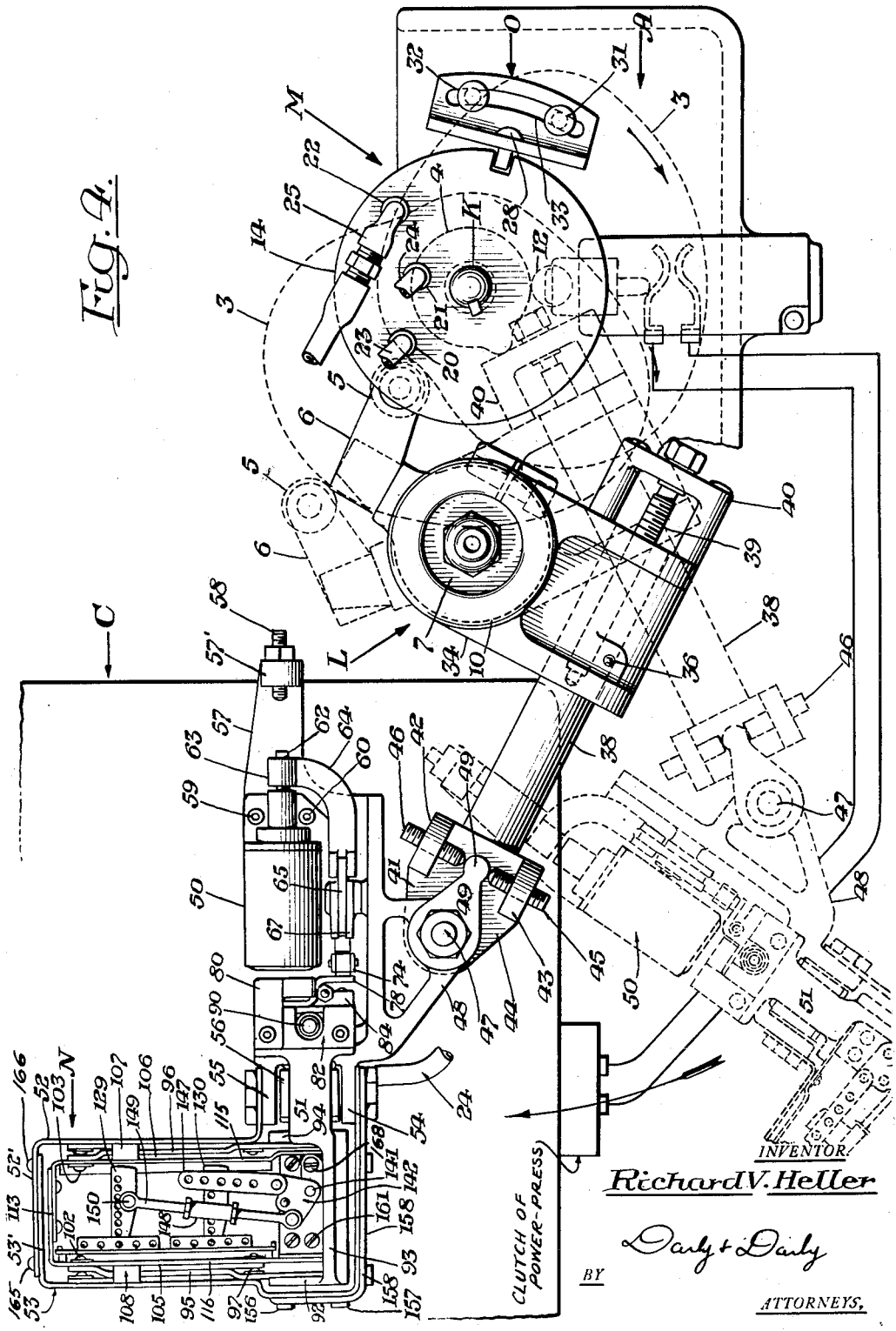

INVENTOR.
Richard V. Heller
BY Daly & Daly
ATTORNEYS.

Nov. 18, 1952     R. V. HELLER     2,618,337
MACHINE FOR FEEDING WORK PIECES TO POWER PRESSES
Filed Feb. 5, 1948     11 Sheets-Sheet 5
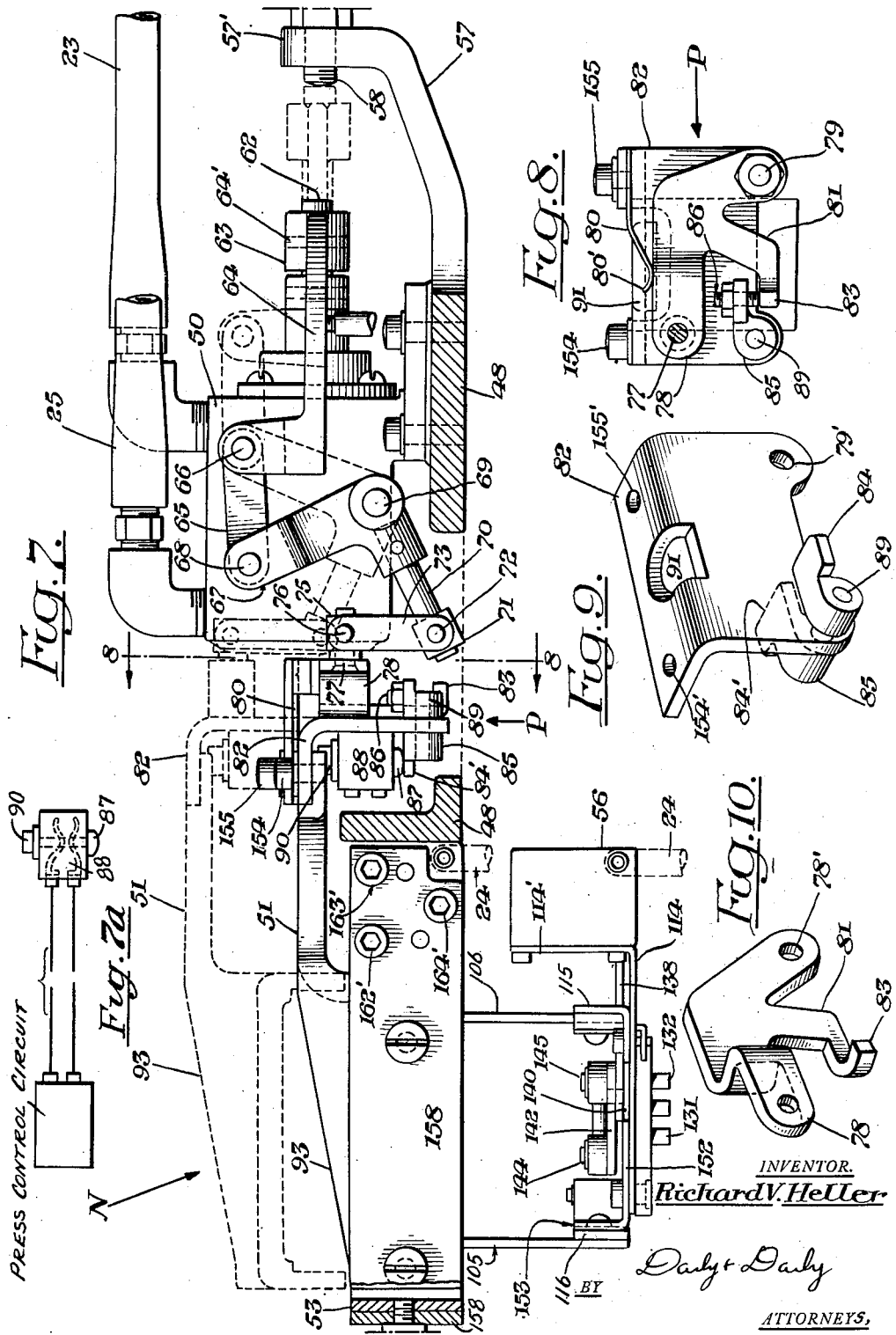

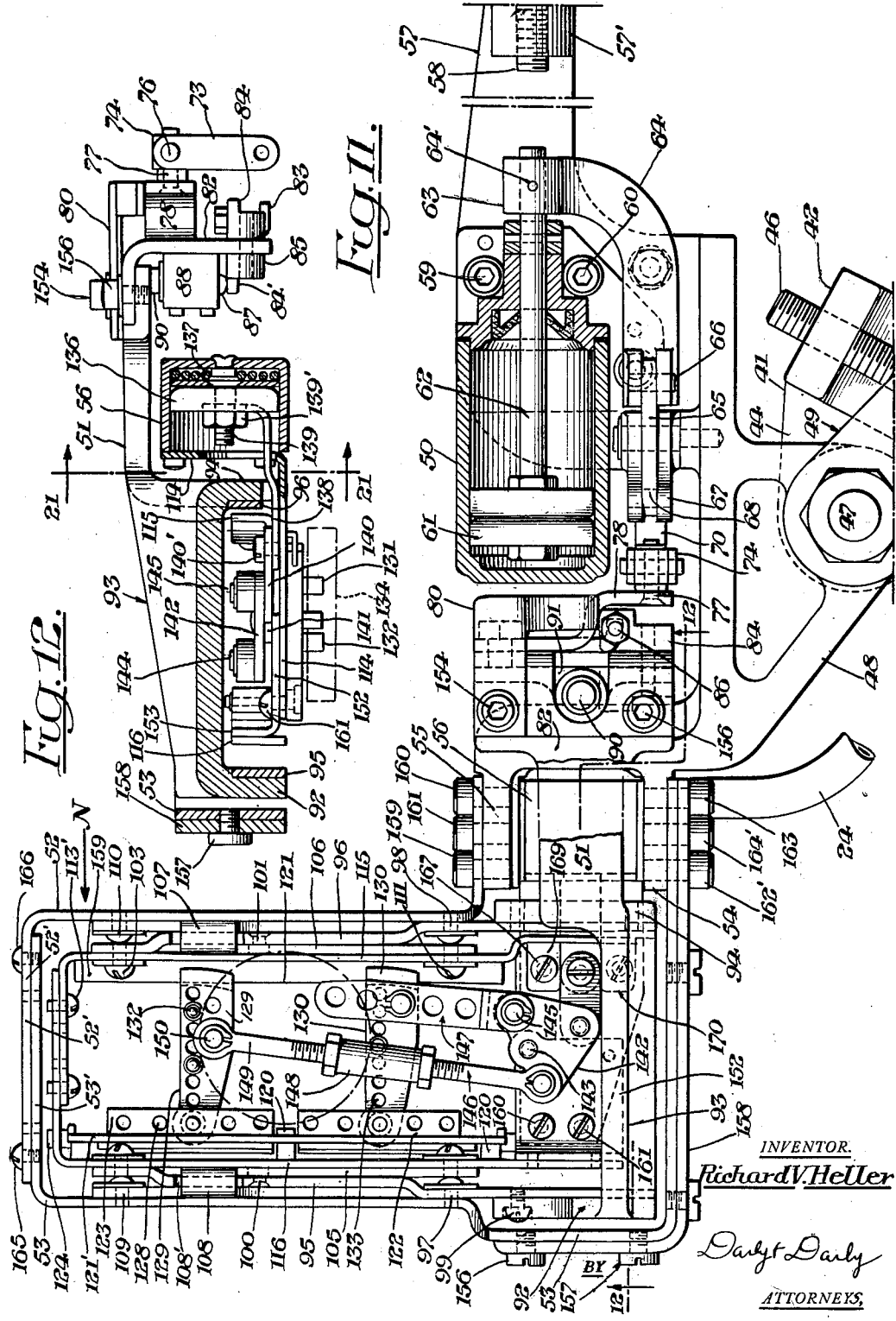

Nov. 18, 1952 R. V. HELLER 2,618,337
MACHINE FOR FEEDING WORK PIECES TO POWER PRESSES
Filed Feb. 5, 1948 11 Sheets-Sheet 7

INVENTOR.
Richard V. Heller
BY Daily & Daily
ATTORNEYS.

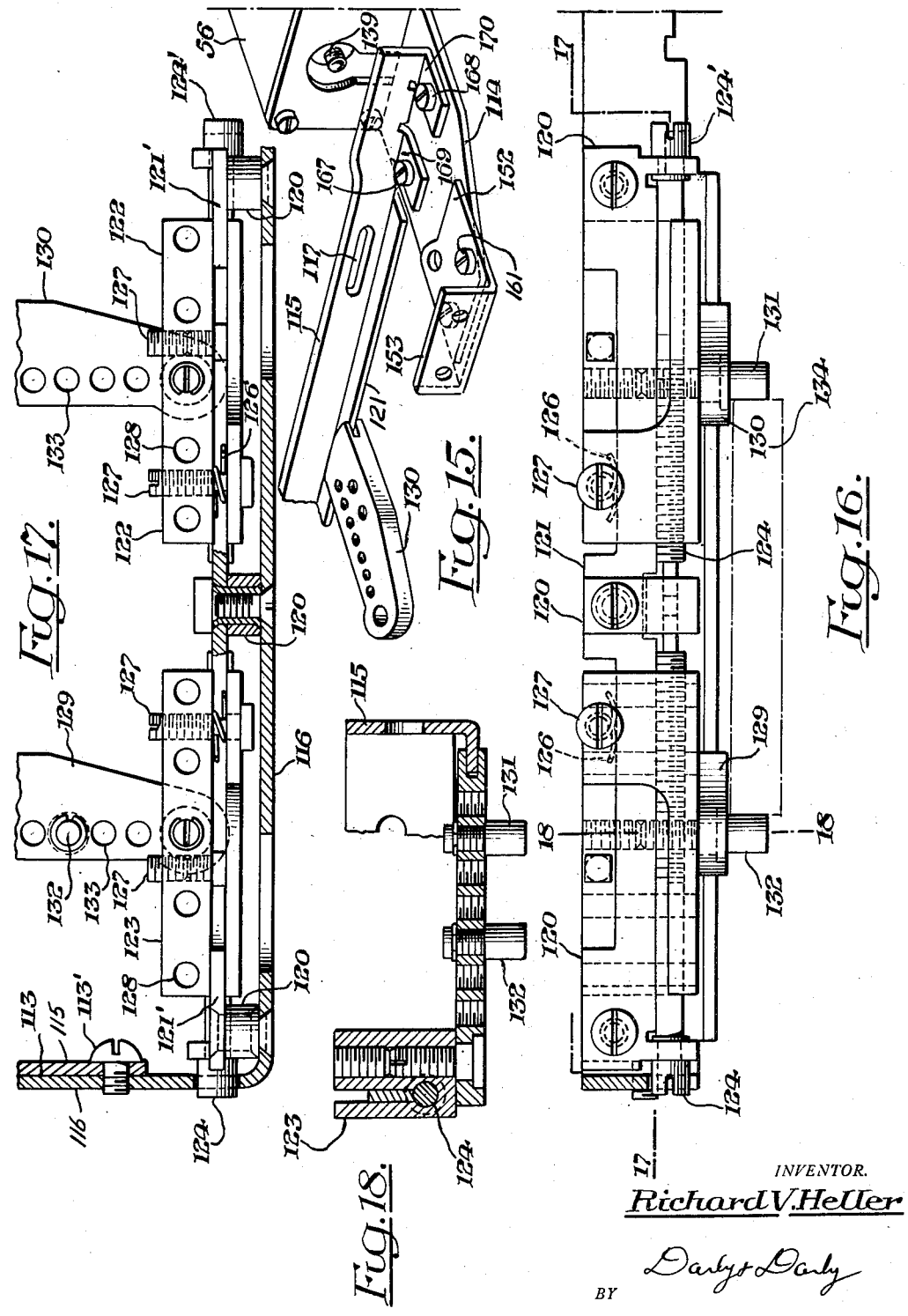

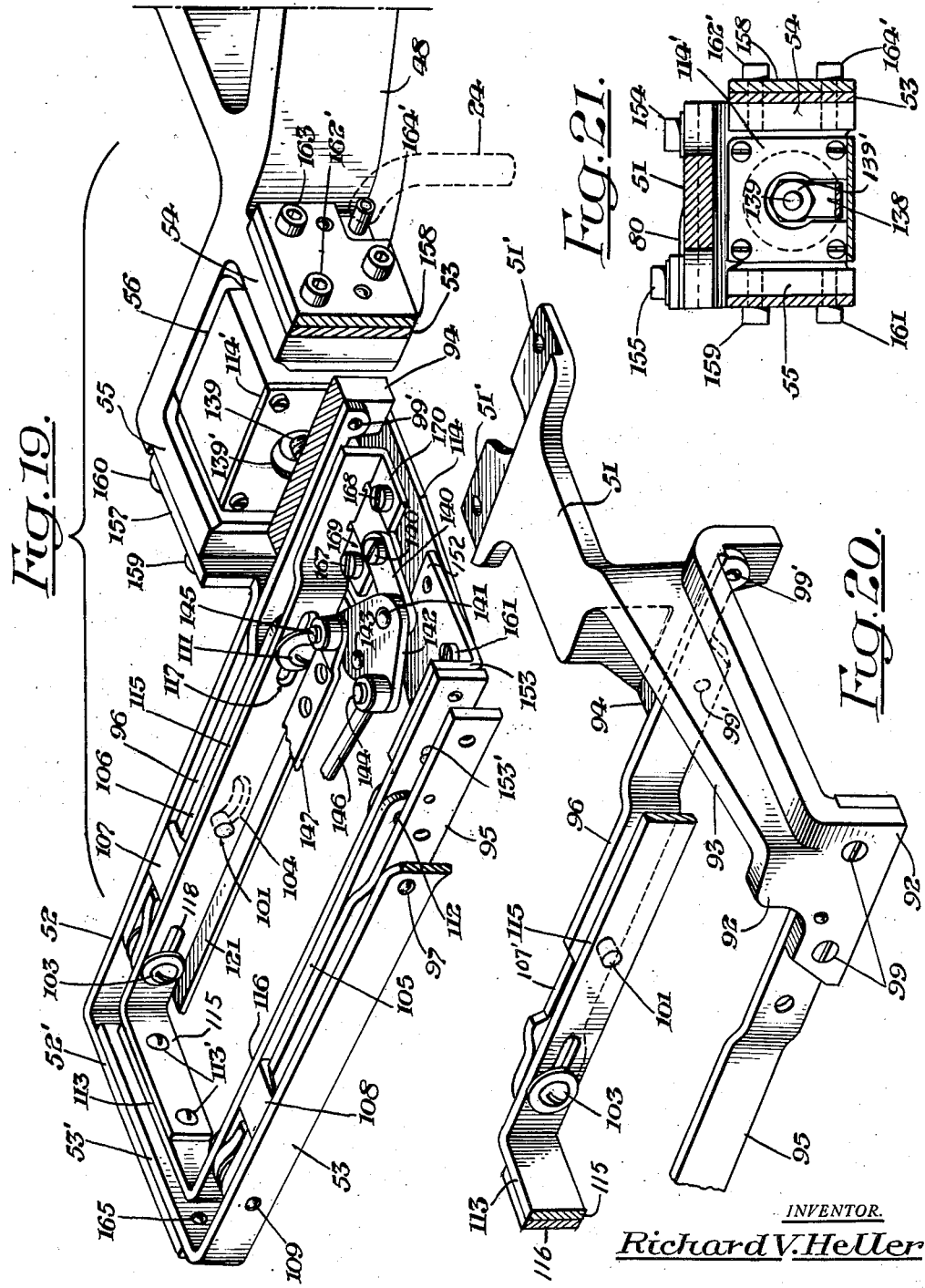

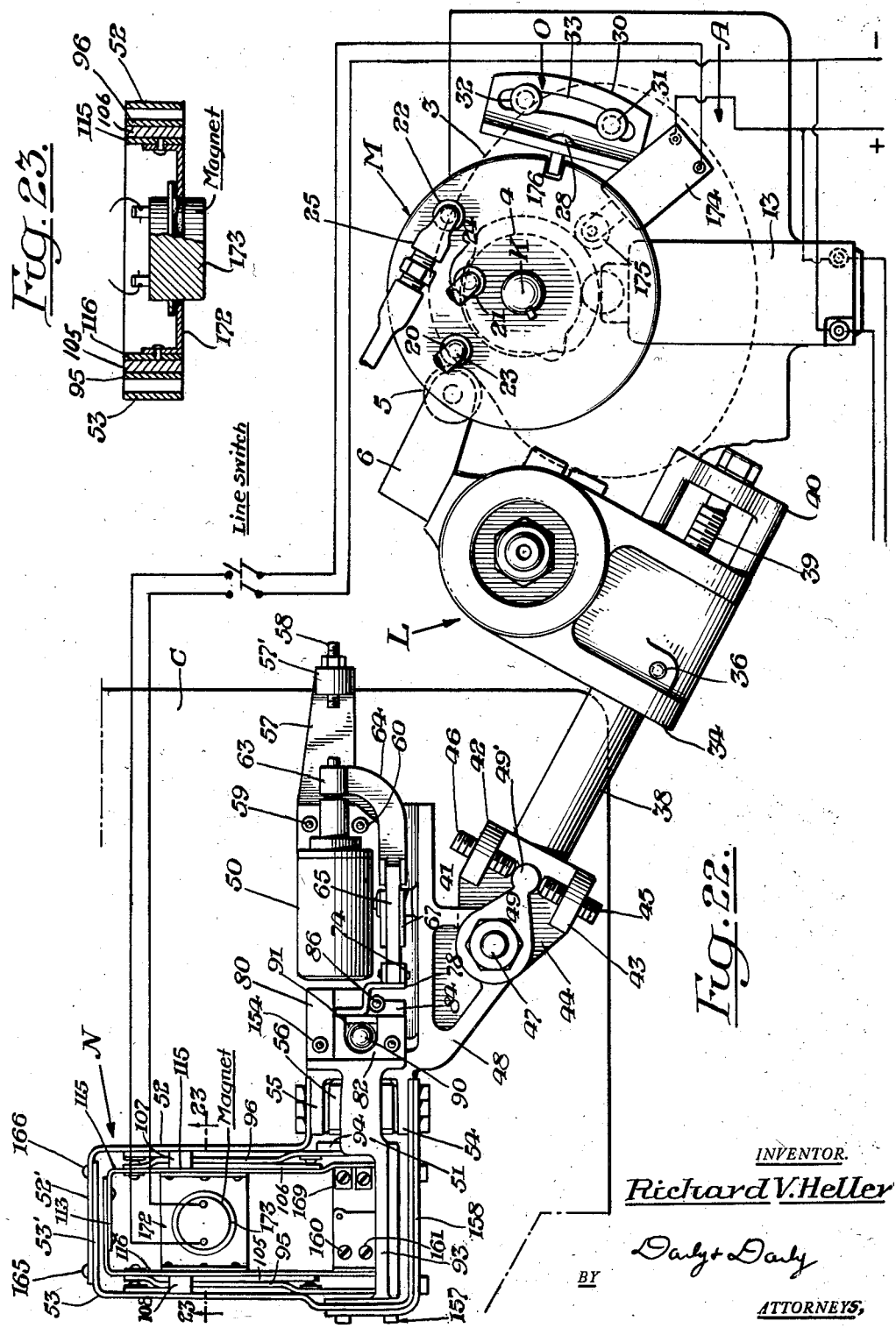

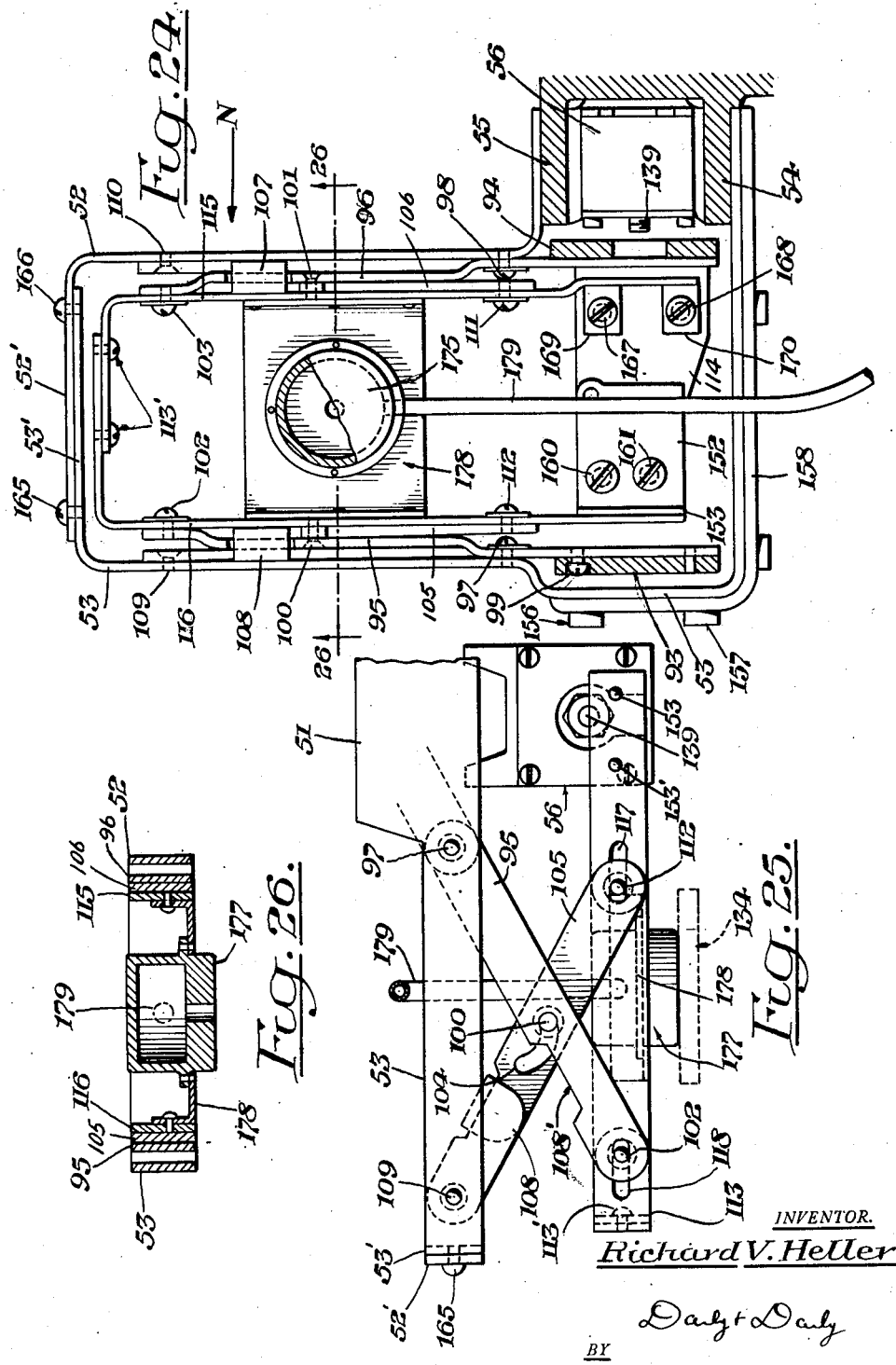

Patented Nov. 18, 1952

2,618,337

UNITED STATES PATENT OFFICE 2,618,337

MACHINE FOR FEEDING WORK PIECES TO POWER PRESSES

Richard V. Heller, New York, N. Y., assignor, by mesne assignments, to Emhart Manufacturing Company, a corporation of Delaware Application February 5, 1948, Serial No. 6,448

17 Claims. (Cl. 164—87)

The invention relates to a machine for feeding work pieces to a power press so that said press may perform an operation upon the same.

The main object of the invention is to provide a machine which may be used either as an attachment to a power press, or as an integrally designed part thereof, and which is provided with mechanism for feeding work pieces in a rapid manner from a predetermined point to the die of said press.

A further object is to provide a machine of the above mentioned character having means for automatically picking up work pieces from a predetermined station and transferring the same to the die of a power press, the operation of said means being controlled by means operated by a vacuum pump.

A further object is to provide a machine of the above mentioned character which is provided with mechanism for tripping the power press in synchronous relation with the work piece feeding mechanism and so that it will perform its operation on the work pieces fed to it at the proper time.

One embodiment of the invention has for one of its objects to provide work feeding mechanism embodying relatively movable mechanical work gripping fingers and novel actuating means therefor.

A further object is to provide a machine of the above mentioned character which is provided with mechanism for rendering the power press inoperative in case of a faulty transfer and deposit of a work piece to the die of the same.

A further object of the invention is to provide a machine for picking up work pieces from a predetermined station and depositing the same on the die of a power press, the picking up and depositing of said work pieces being effected by a magnetic means.

A further object is to provide a machine for automatically feeding work pieces to a power press from a predetermined station and with complete safety to the operator thereof.

A further object is to provide a machine for picking up work pieces from a position or station remote from a power press, and depositing the same on the die of said press, the picking up and depositing of said work pieces being effected by a vacuum means.

A further object is to provide a machine for feeding work pieces to a power press, the mechanism of which is capable of a great range of adjustment to adapt it for operation with different types of presses.

The foregoing objects, features and advantages, and others which will appear more fully hereinafter, are accomplished by the mechanisms illustrated in the accompanying drawings, the figures of which show the following—

Figure 1 is a front elevation of a machine constructed in accordance with the invention;

Figure 2 is a sectional plan view of the transfer arm column forming part of the mechanism of the machine, and taken on the line 2—2 of Figure 1;

Figure 3 is a side elevation of the machine as seen from the right of Figure 1;

Figure 4 is a top plan view of the mechanism of the machine, and showing the movements which are imparted to the transfer column, transfer arm, and the work piece feeding hand during the operation thereof;

Figure 7 is an elevational and partial sectional view showing the feeding hand and the mechanism thereof which is operated by the piston of one of the vacuum cylinders of the machine;

Figure 7a is a diagrammatic illustration of the press control circuit and switch.

Figure 8 is a view of the safety tripping mechanism, employed in the machine, for interrupting the operation of the power press in case of a faulty feeding of a work piece to the die thereof, said view being taken on the line 8—8 of Figure 7, looking in the direction of the arrows;

Figure 9 is an elevational perspective view of the lift lever forming part of the tripping mechanism;

Figure 10 is an elevational perspective view of the trip lever forming part of the tripping mechanism;

Figure 11 is a plan view, shown partly in section, of the feeding hand and showing the vacuum cylinders of the machine;

Figure 12 is a sectional view of Figure 11, taken on the line 12—12 thereof, and looking in the direction of the arrows;

Figure 15 is an elevational detail perspective view of certain parts associated with one of the vacuum cylinders and the bracket which supports the work piece gripping mechanism;

Figure 16 is a side elevational view of the means employed for adjusting the position of the gripper jaw blocks;

Figure 17 is a sectional plan view of Figure 16 taken on the line 17—17 thereof;

Figure 18 is a sectional view of Figure 16 taken on the line 18—18 thereof;

Figure 19 is a perspective view of the pickup platform and mechanism associated therewith, and with parts shown broken away;

Figure 20 is a perspective view of the pickup frame lifting lever.

Figure 21 is a sectional view of Figure 12, taken on the line 21—21 thereof, and showing one of the vacuum cylinders forming part of the mechanism of the machine;

Figure 22 is a view similar to Figure 4, but showing a modified construction of the feeding hand, said feeding hand being provided with a magnetic pickup means;

Figure 23 is a sectional view of the feeding hand shown in Figure 22, and taken on the line 23—23 of that figure, looking in the direction of the arrows;

Figure 24 is a plan view of a further modified construction of the feeding hand, and showing the same provided with a vacuum work piece pickup means;

Figure 25 is a detail view of the mechanism employed for raising and lowering the platform of the feeding hand when vacuum pickup means, such as is disclosed in Figure 24, is employed; and Figure 26 is a sectional view of the feeding hand shown in Figure 24, taken on the line 26—26 of that figure and looking in the direction of the arrows.

Figure 5:
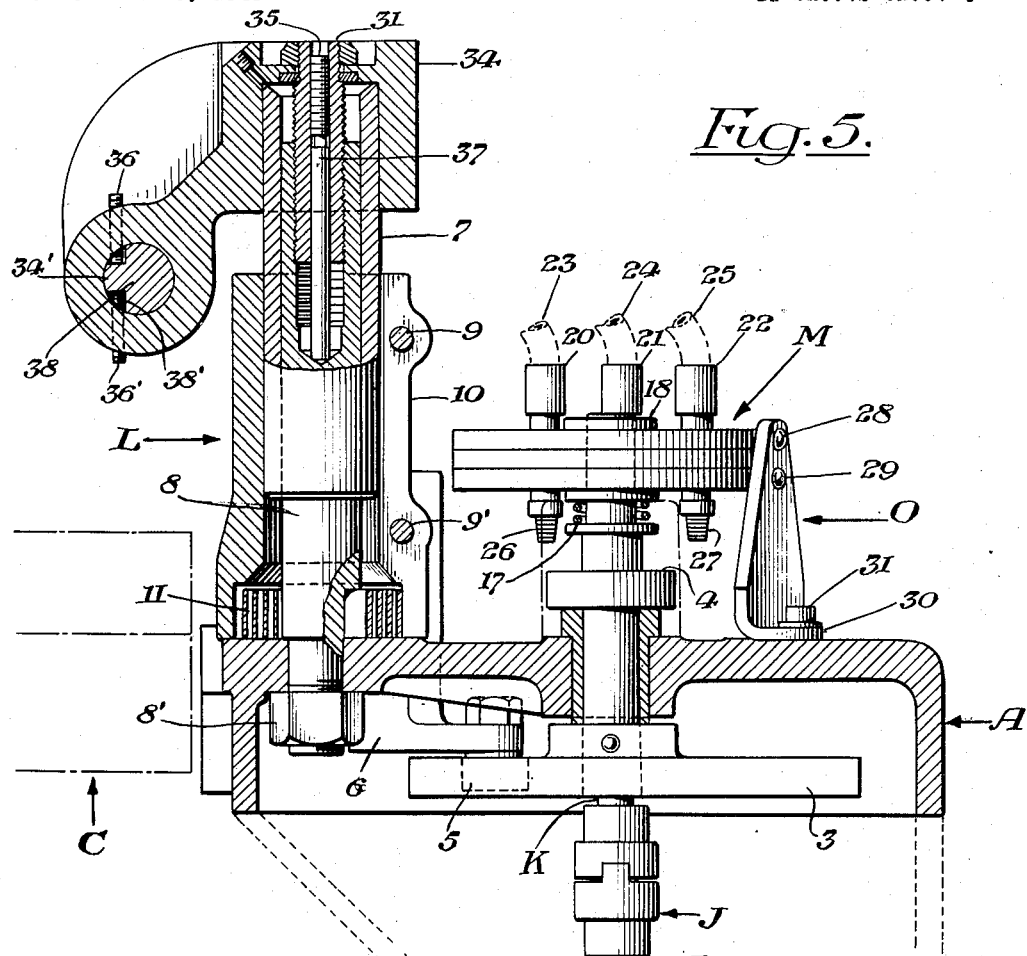
Figure 5 is a vertical sectional view of the transfer column and of the upper supporting frame of the machine, and also showing the vacuum valve which forms part of the machine mechanism.

Referring more in detail to the drawings, the mechanism of the invention for effecting the picking up and transferring of the work pieces to the work forming station of a power press is shown as mounted upon a supporting framework and so that said mechanism and framework will provide a separate machine unit which is adapted to be positioned for operation adjacent to a power press. It is to be understood, however, that the mechanism of the machine, if desired, may be mounted and supported directly upon the framework of the power press itself and thus become an integral part of the power press mechanism.

The framework of the machine, as shown in the drawings, is generally designated by the letter A, and is supported on the three legs B. These legs may take the form of jacks which are adapted to be adjusted to permit accurate vertical and horizontal positioning of the mechanism of the machine with respect to the platen C of the power press. It is to be understood that the work is formed or fashioned by a die or other suitable tool (not shown) and the work forming station is located on the power press platen to which the work pieces are fed by the mechanism of the present invention. The supporting framework may also be adjusted with respect to the platen of the die press by means of the connecting plate D (see Figure 3), which is provided with the bolts D' for securing said framework to the power press framework.

Mounted upon a support E, secured to the framework and to the legs B, is an electric motor F. The motor is provided with the pulley G which drives a speed reduction unit H by means of the belt H'. The speed reduction unit H drives a shaft I which is coupled to a cam shaft K by a coupling indicated at J.

Keyed to the cam shaft K is the transfer cam 3 and the switch cam 4. The transfer cam 3 is positioned within a housing forming part of the framework A (see Figure 1) and acts upon the cam follower 5, carried by a bracket 6 extending from the transfer column generally indicated by the letter L.

Within the transfer column L is a sleeve 7 which is rotatively mounted on the vertically extending shaft 8 (see Figure 5). The shaft 8 is secured to the framework A by a nut 8'. Secured to the sleeve 7 by the bolts 9 and 9', and so that it will move with said sleeve, is the transfer column member 10. When the cam 3 is given a rotative movement by the cam shaft K, in the direction shown by the arrows in Figure 4, it causes the cam follower 5 and bracket 6 fixed to member 10 to impart an oscillating movement to the transfer member 10 and sleeve 7; the transfer arm 38 connected with said sleeve, and the work piece feeding hand mechanism, generally indicated at N, moving the latter away from the platen C of the power press, and to a predetermined position or station remote from said platen as indicated by the dotted lines in Figure 4, and so that the work piece pickup mechanism of the feeding hand N will be in position to pick up a work piece to be transferred to the die on the platen C of the power press. The transfer column L, transfer arm 38, and the feeding hand mechanism N are caused to be moved to the position over the platen of the power press, as shown by the solid lines in Figure 4, by means of a spring 11, which is mounted within the transfer column member 10 and so that one end thereof is secured to the fixed shaft 8, and the other end to the transfer column member 10, as shown in Figure 2. The spring 11 also functions to hold the transfer column member 10 so that the cam follower 5 will always be pressing against the cam 3.

The switch cam 4 is positioned on the cam shaft K so that it will engage with a roller 12 associated with an electrical switch 13 (see Figure 4). The roller 12 functions to operate the mechanism (not shown) of the electrical switch 13, to cause said switch to effect the operation of an electrical circuit which controls the operation of the mechanism of the power press at predetermined timed intervals so that the punch of said press will perform its operation on work pieces fed to the die of the press by the feeding hand mechanism of the machine. The switch 13 may be of any well known type which is adapted to effect the operation of the electrical circuit which causes the clutch mechanism of the power press to operate the punch of said press.

Also keyed to the shaft K is a vacuum valve generally indicated in Figures 1, 3, 4 and 5, by the letter M. The vacuum valve operates in conjunction with a vacuum pump (not shown), and in conjunction with vacuum cylinders 50 and 56 (shown in Figures 4, 7, 11, 12, 13, 19 and 21), for applying a vacuum and air to said cylinders at predetermined times, to effect the operation of certain of the mechanisms of the machine as will be more fully explained later on herein.

Figure 6:
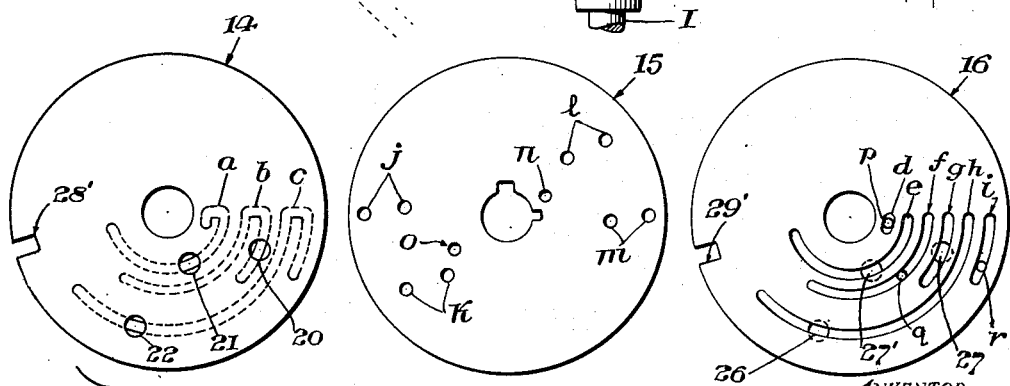
Figure 6 is a plan view of the three disc plate elements of the vacuum valve construction.

The vacuum valve M is provided with the three disc plate elements 14, 15 and 16 (see Figure 6). The middle disc plate element 15 is keyed to the cam shaft K and rotates therewith and is provided with the openings $j$, $k$, $l$, $m$, $n$ and $o$ therethrough, the purpose of which will be later explained. The disc plate elements 14 and 16 are loosely mounted on the shaft K and are provided respectively with the channels $a$, $b$, $c$, and $d$, $e$, $f$, $g$, $h$, and $i$ therein which will also be more fully referred to hereinafter. The disc plate elements 14 and 16 are held in contacting relation with respect to disc plate element 15 by the pressure exerted by a spring 17 against the collar 18 fixed to shaft K.

Communicating with the channels $a$, $b$ and $c$ formed in the disc plate element 14 are the connectors 20, 21 and 22 to which the conduits 23, 24 and 25 are connected. These conduits communicate with the vacuum cylinders 50 and 56. Communicating with the channels $e$, $g$ and $h$, formed in the bottom disc plate element 16, are the nozzles 27', 27 and 26 respectively which are adapted to be connected to a vacuum pump (not shown). Also communicating with the channels $d$, $f$ and $i$, formed in the disc plate element 16 are the air holes $p$, $q$ and $r$ respectively which are open to the atmosphere.

The disc plate elements 14 and 16 are held in a stationary position with respect to each other and with respect to the disc plate element 15 by means of the pins 28 and 29 which extend through a bracket designated generally by the letter O, and into notched openings 28' and 29' formed in said disc plate elements. The bracket O is formed with a flanged base portion 30 which is secured to the supporting framework A by the bolts 31 and 32, which project through a slot 33 provided in the flanged base portion 30. By reason of this bracket construction the positions of the connectors 20, 21 and 22, and the nozzles 26, 27 and 27' which communicate with the channels in the disc plate elements 14 and 16, may be adjusted with respect to the openings through the disc plate element 15 for the purpose of timing the operation of the several mechanisms associated with the vacuum cylinders 50 and 56.

Mounted upon the upper end of the sleeve 7 of the transfer column L is a transfer arm holder member 34. The arm holder member is adapted to be adjustably positioned as to height, as well as axially, with respect to the sleeve 7, by means of the screw 35 (see Figure 5). The screw 35 has threaded engagement in an adapter 35' which is threaded into the shaft 8 and locked in place by the pressure of screw 35 on the lock pin 37 which in turn presses upon shaft 8. The transfer arm holder member 34 is provided with the openings 34' therethrough and which support the transfer arm shaft 38. The transfer arm shaft is adjustable lengthwise with respect to the arm holder 34 by means of an adjustment screw 39 which has threaded engagement with said arm and which is retained and supported in an adjustment bracket 40 secured to and projecting from the side of said arm holder member 34 (see Figure 4). Angular adjustment of the transfer arm 38 is provided by the screws 36 and 36' which extend through the base of the transfer arm holder 34, as shown in Figure 5, and which screws abut against a rectangular shaped cutout portion 38' formed in said arm 38.

Referring more particularly to Figure 4, the outer end of transfer arm shaft 38 is provided with the bracket member 41 which is provided with the upstanding lugs 42 and 43, and the triangular shaped base portion 44. Mounted in the lugs 42 and 43 are the adjusting screws 45 and 46. Fixedly secured to a pivot pin 47 which extends through the outer pointed end of the triangular shaped base portion 44 of bracket member 41 is the supporting arm 48. Also secured to said pivot pin 47 is a triangular shaped adjustment plate 49, the pointed end 49' of which extends between the inner ends of screws 45 and 46 mounted in the lugs 42 and 43 of bracket member 41. By reason of the above described construction and arrangement of the parts the pointed end 49' of the triangular shaped adjustment plate 49 may be moved by turning either of the screws 45 or 46 and thus the angle at which the supporting arm is positioned with respect to the transfer arm shaft 38 may be adjusted.

Secured to the supporting arm 48 by the bolts 59 and 60 is the vacuum cylinder 50 in which is slidingly positioned the piston 61 secured to the piston rod 62 (Figure 11). The conduit 25 which is connected to the vacuum valve M shown in Figures 1, 3 and 5 communicates with the forward end of said vacuum cylinder and the conduit 23, also connected to the vacuum valve, communicates with the rear end of said cylinder.

Referring to Figures 7 and 11, the end of piston rod 62, of cylinder 50, is shown as secured by a pin 64' in a collar 63, formed at one end of an arm 64. The other end of arm 64 is connected to a link 65 by the pin 66 and the other end of link 65 is connected by the pin 68 to one arm of a bell crank lever 67. The bell crank lever is fulcrumed by pin 69. The other arm of bell crank 67 comprises a pin 70 which carries a yoke 71 on a pin 72. Connected to pin 72 is the link 73, the other end of which is connected to a yoke 75 by means of the pin 76. The yoke 75 is rotatable on a pin 77 which is fixedly secured to the trip lever 78 of the safety switch tripping mechanism which is generally indicated in the drawings by the letter P.

The safety switch tripping mechanism P functions to interrupt the operation of the punch of the power press in case of a faulty feeding of a work piece to the die of the press by the mechanism of the feeding hand N of the machine. It also forms part of the mechanism associated with the lifting lever arm 51 which effects the lifting and lowering of the work piece gripping platform to be later explained.

The safety switch tripping mechanism, the parts of which are shown more clearly in Figures 8, 9, and 10, is comprised of the lift lever 82, the trip lever 78, the spring 80, and the shut-off lever 85.

The lift lever 82 is secured to the inner end of the lifting lever arm 51 (shown more clearly in Figure 20) by the bolts 154 and 155 which extend through the openings 154' and 155' of said lift lever and through openings 51' in the end of said lifting lever arm. Secured to the lift lever 82 of the safety switch tripping mechanism, by the bolt 155 is the spring 80, the free end 80' of which is in contacting relation with the trip lever 78. The trip lever 78 is pivotally secured to the lift lever 82 on a pin 79 which extends through the hole 78' in said trip lever and the hole 79' in said lift lever. The trip lever is provided with an arm 81 at the free end of which is provided the curved dog 83. The dog 83 abuts against a screw 86 positioned in an arm 84 of the shutoff lever 85 (see Figure 9). The shutoff lever is fixed to one end of a pin 89 mounted in a hole extending through said lift lever 82 the other end of said pin being also provided with the arm 84'. The upper surface of arm 84' is adapted to press against a shutoff button 87, associated with an electrical switch 88 which is mounted on the lift lever 82, as shown in Figure 7.

By reason of the above described construction and arrangement of the parts of the tripping mechanism, the bell crank lever 67 of the linkage operated by the piston rod of vacuum cylinder 50 in the absence of any obstruction to movement of die of the power press, is connected in such manner to the trip lever 78 which in turn abuts against the spring 80 connected to lift lever 82, so that any motion of the bell crank lever will be transmitted to the lift lever 82 through said spring as if said parts were solidly connected together. However if an obstruction is encountered to the die movement of the power press due to the faulty feeding of a work piece to it by the feeding hand mechanism of the machine, the spring 80 will be deflected and will thus cause rotative movement to be imparted to the trip lever with respect to the lift lever 82 and this will result in the end of the curved dog 83 on arm 81 of the trip lever pressing against screw 86 positioned in arm 84 of the shutoff lever 85 and cause the arms 84 and 84' of the shutoff lever to be raised and arm 84' to be pressed against the button 87 of the switch 88 and so that said switch will be operated. The switch, which is connected in an electrical circuit (not shown) controlling the operation of the power press tripping mechanism, will thus instantly open said electrical circuit and the operation of the press tripping mechanism will be stopped. The switch 88 may be reset for closing the electrical circuit which operates the power press tripping mechanism by manually pressing the button 90 of the switch, shown in Figure 11, and which is positioned so that it will project through the opening 91 of the lift lever 82.

The outer end of the supporting arm 48 is provided with the extension arms 54 and 55 (more clearly shown in Figure 19). Secured to these extension arms by bolts 162, 163, 164, 162', 163' and 164' are one of the ends of the bearing brackets 52 and 53 of the feeding hand assembly. The other ends 52' and 53' of these bearing brackets are secured together by the bolts 165 and 166. Also secured to the extension arm 54 of the supporting arm 48, by the bolts 162', 163' and 164' is one end of the bearing bracket brace arm 158. The other end of said brace arm is secured to bearing bracket 53 by the bolts 156 and 157.

The extension arms 54 and 55 of supporting arm 48 are positioned so that they will extend on either side of the vacuum cylinder 56 and thus function as guides for said cylinder as it is raised and lowered with the work piece gripping mechanism of the feeding hand N, as will be later pointed out.

The inner end of supporting arm 48 (see Figure 4) is formed with an extension 57 upon which is formed a boss 57', in which is supported a stop screw 58. The stop screw 58 may be adjustably positioned in the boss 57' to regulate the extent of movement of the piston rod 62 of the vacuum cylinder 50.

The lifting lever arm 51, more clearly shown in Figure 20, is provided with the extensions 93 and 94. The end 92 of extension 93 of said lever is secured by the bolts 99 to one end of the work piece lift lever 95 of the feeding hand assembly, and the extension 94 is secured to one end of the work piece lift lever 96 of said feeding hand assembly by the bolts 99'. The work piece lift levers 95 and 96 are pivoted to the bearing brackets 52 and 53 on the pins 97 and 98 (see Figures 4, 11, 13 and 14). This results in the levers 95 and 96 being attached as a unit with the lifting lever arm 51, such unit pivoting on the pins 97 and 98. The levers 95 and 96 carry the pins 100 and 101 and also the pins 102 and 103. The pins 100 and 101 slide in slots 104 formed in the intermediate lift levers 105 and 106, said slots being curved in shape to cause levers 105 and 106 to swing downwardly so that the ends thereof will be level with the ends of levers 95 and 96. The levers 105 and 106 are also formed with the curved portions 107 and 108, which are adapted to seat into cutout portions 107' and 108' of levers 95 and 96. The levers 105 and 106 at one end are pivoted at 109 and 110 on brackets 53 and 52 respectively and also carry the pins 111 and 112 at their other ends. The pins 111 and 112, as well as pins 102 and 103, support the pickup platform formed by the two platform walls 115 and 116 which form the pickup platform generally indicated in the drawings by the numeral 113 (see Figure 14).

Referring to Figures 7, 12, 13 and 19, the vacuum cylinder 56 is secured to the vertically extending flange portion 114' of a support bracket member 114. The bracket member 114 is secured by the bolts 160 and 161 to the toggle block anchor plate 152. The anchor plate 152 is provided with a vertically extending flanged portion 153 which is secured to one end of lift platform wall 116 by the bolts 153'. The bracket member 114 connects the two lift platform walls 115 and 116 of the pickup platform 113, one end of wall 115 being secured to the bracket member by the bolts 167 and 168 extending through the two flanged portions 169 and 170 of said wall. The outer ends of the walls 115 and 116 are secured together by the bolts 113'. The walls 115 and 116 are provided with the slots 117 and 118 (see Figure 14) which provide a bearing for the pins 102 and 103 and 111 and 112. The said walls 115 and 116 also support the jaw adjustment rails 121 and 121', the purpose of which will be later referred to.

An arm 138 is secured by the nut 139' to the screw threaded end 139 of the piston 136 which is positioned in the vacuum chamber 56. The other end of the arm 138 is attached to a toggle link 140 by the pin 140'. The link 140 carries the pin 141 fixed in the toggle block 142 which is positioned so that it will pivot on the pin 143.

Figure 13:
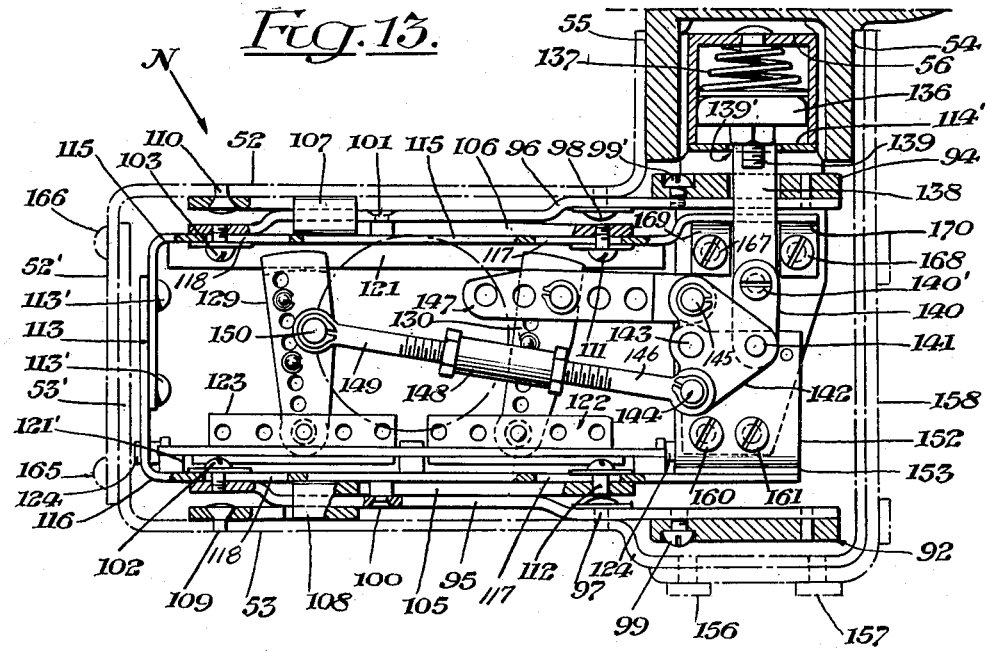
Figure 13 is a plan view of the feeding hand and showing the work piece pickup platform and its associated mechanism.
Figure 14:
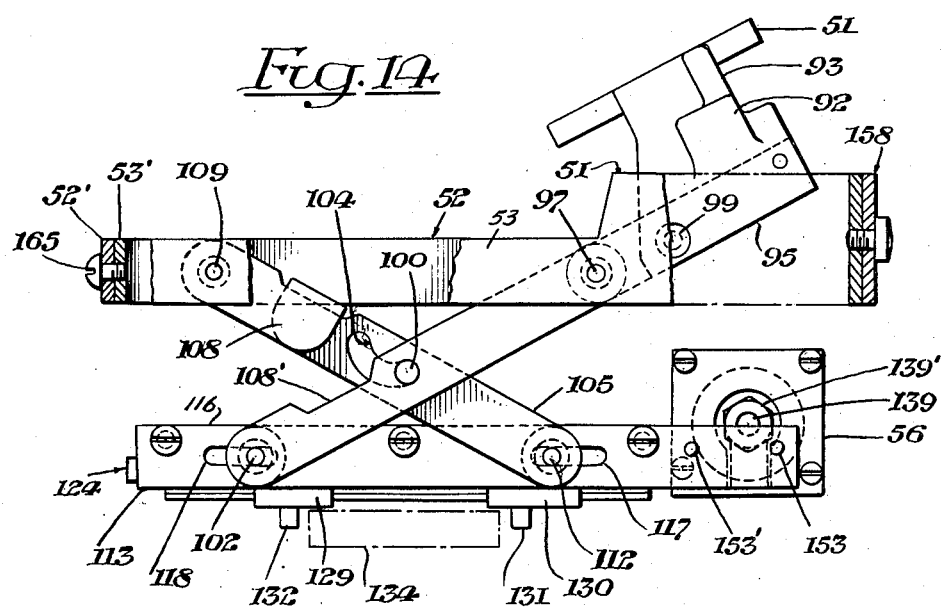
Figure 14 is a side elevational view showing parts of the work piece pickup platform and when said platform is in its lowermost position.

The toggle block 142 carries two pins 144 and 145 to which is attached the links 146 and 147 (see Figures 11, 13 and 19). The link 146 has its end threaded in a turnbuckle bushing 148 which in turn carries the link 149 attached to the jaw pivot block 129 by the pin 150. The link 147 is provided with six holes therein any one of which can be attached to the jaw pivot block 130. The oscillation of toggle block 142 by the operation of the piston in vacuum chamber 56 and its connected linkage causes the jaw pivot blocks 129 and 130 to oscillate in a horizontal plane and open and close by reason of the linkage associated with said toggle block.

The vacuum cylinder 56 is evacuated of air and air supplied thereto, at timed intervals, through the conduit 24 by the operation of the vacuum valve M, as will be later more fully explained. When vacuum is applied to said cylinder, the piston 136 thereof is caused to retract in the cylinder compressing the spring 137, as shown in Figure 12, and when the vacuum applied to said cylinder is shut off by the operation of said vacuum valve and air is admitted thereto, the spring 137 and the air force said piston forwardly in the cylinder as shown in Figure 13. Thus the linkage connected to the piston 136, as above pointed out, and which operates the jaw pivot blocks 129 and 130, is operated at predetermined timed intervals as the feeding hand assembly is swung towards and away from the platen of the power press, and causes said jaw blocks to release and grasp work pieces through their finger pins 131 and 132.

Referring more in detail to the linkage operated by the movement of the piston 136 of the vacuum cylinder 56, it is apparent that when vacuum is applied to cylinder 56 behind the piston, the said piston retracts against the spring 137 and pulls arm 138 and link 140, thus causing the toggle block 142 to rotate on the pin 143. The toggle block being attached to links 146 and 147 cause the jaw pivot blocks 129 and 130 to be drawn together. The jaw blocks in turn will thus cause the finger pins 131 and 132 which are attached thereto, to grip a work piece, indicated at 134. When the jaw pivot blocks are caused to be spread apart from each other by the linkage operated by the piston 136 during the reverse movement of said piston, the finger pins 131 and 132 will release the said work piece.

In Figures 16, 17 and 18 the pickup platform wall 116 is shown as supporting the rail 121' by means of the front, center and rear blocks 120. The rail 121' carries the blocks 122 and 123 which are adjustable along said rail by means of the adjusting screws 124 and 124' which are threaded in the blocks 122 and 123 and retained in said blocks 120. The clamp springs 126 exert a pressure on the blocks 122 and 123 against the screws 127, thus retaining the said blocks in adjustment. The square-headed block screws 127' (see drawing) may be rotated and locked so that the heads act as locking cams to take up any clearance between the blocks and the rail 121 thus firmly securing said blocks to said rail. The blocks 122 and 123 are provided with the holes 128 therein, any one of which may be used as a pivot hole for the jaw pivot blocks 129 and 130. The jaw pivot block pins 131 and 132 which function as gripper fingers for grasping the work pieces 134, are adapted to be positioned in any one of the several holes 133 of the jaw pivot blocks. Additional support for the blocks 129 and 130 is provided by rail 121' and the length of adjustment of the position of the blocks 122 and 123 is equal to the distance between the holes 128 in said blocks so that an infinite adjustment between extreme holes is obtainable.

The platform wall 115 has secured thereto the rail 121 along which is slidingly mounted the other ends of the pivot jaw blocks 129 and 130.

Referring to Figures 5 and 6, the vacuum valve M of the machine operates in the following manner to effect the movements imparted to the pistons 61 and 136 positioned in the vacuum cylinders 50 and 56.

The fixed upper disc plate member 14 of the vacuum valve, a top plan view of which is shown at the left of Figure 6, is provided with the channels a, b and c which are formed in the lower face thereof, as above stated. The conduits 23 and 25, which are connected with the vacuum cylinder 50, communicate through the connectors 20 and 22 with the channels b and c, and the conduit 24, which is also connected with the vacuum cylinder 56, communicates through the connector 21 with the channel a.

The fixed lower disc plate member 16 of the vacuum valve, a top plan view of which is shown at the right of Figure 6, is provided with the channels d, e, f, g, h and i, which are held in communicating relation with respect to channels b and c of disc plate member 14 during the operation of the vacuum valve. The nozzles 26, 27 and 27' indicated in the drawing of the disc plate member 16, and which are connected to a vacuum pump, communicate with the channels g, h and e of said disc plate member. The lower disc plate member is also provided with the holes p, q and r, which extend therethrough.

The center disc plate member 15, which rotates with the shaft K, is provided with the openings j, k, l, m, and o therethrough which are positioned in such manner that they will communicate at timed intervals with the channels f, g, h, and i of the lower disc plate member 16, and with the two branches of the channels b and c of the upper disc plate member 14, when said disc plate member 15 is rotated. The center disc plate member 15 is also provided with a hole n therethrough which communicates with the channels d, and e of the lower disc plate member 16 and with the two branches of the channel a of the upper disc plate member 14, during the rotation of the shaft K.

When the valve device functions, the channels d, f and i of the lower disc plate member 16 are connected by the holes p, q and r to atmosphere. Thus, as the disc plate member 15 rotates the outer hole m therein first connects the connector 22 for conduit 25 to atmosphere, connecting it through the hole r, to channel i and channel c, in upper plate 14. At the same time connector 20 connected to conduit 23 is connected to vacuum through nozzle 27 through channel g, in plate 16, to the inner hole m, through disc plate 15, and also channel b of disc plate 14. As the disc plate 15 rotates further, the holes l, of disc plate 15 come into register with the channels f and h of disc plate 16 immediately after the holes m pass out of registering position with respect to channels g and i of disc plate 16, and the holes l in disc plate 15 function to reverse the connector 20 and air is then applied to connector 20 and vacuum is applied to connector 22 and through conduit 25. Thus vacuum and air are alternately applied to the opposite ends of the piston 61 of cylinder 50. Due to the position of the second pair of holes j and k in disc plate 15, the piston 61 of cylinder 50 is held in the right hand end of the cylinder during substantially 180° rotation of the disc plate member 15, after which the said piston makes another complete stroke in the said cylinder.

With respect to the operation of the piston 136 in the cylinder 56, the vacuum valve also operates to apply vacuum to the cylinder through nozzle 27' of the disc plate 16 to channel e of said disc plate member, and then to channel a of disc plate 14 through hole o in disc plate 15, connector 21 and conduit 24 and thus cause the piston 136 to retract and then as the disc plate 15 continues to revolve, air flowing through hole p in disc plate 16 and through channel d of said disc plate and through hole n, of disc plate 15, to channel a and connector 21 of disc plate 14, enters the cylinder through conduit 24 behind the piston and causes it to be moved to the position shown in Figure 13.

It will thus be seen that the piston 61 of cylinder 50 and piston 136 of cylinder 56 will be reciprocated back and forth in said cylinders at predetermined intervals and the movements imparted to said pistons will effect the operation of the mechanisms associated therewith to cause the lifting and lowering of the feeding hand N and the opening and closing of the jaw blocks 129 and 130 and their gripping fingers 132 and 134.

In Figures 22 and 23, there is shown a magnet means, which may be employed by the machine for effecting the pickup and release of the work pieces and which may be used in place of the movable jaw blocks 129 and 130 above described. The magnet means is secured by a bracket 172 to the lift platform walls 115 and 116 of the feeding hand assembly N. The bracket means supports a magnet 173 which is connected to an electrical circuit controlled by a switch 174 mounted on the machine framework A. The switch is operated by a roller 175 which is in contact with a cam 176 mounted on the cam shaft K. As said cam is rotated by the shaft K it causes the roller 175 at timed intervals to operate said switch which opens and closes the electrical circuit connected with the magnet 173 to cause said magnet to pick up and release work pieces as the feeding hand N is moved away from and towards the platen C of the power press. When this magnet means is employed for picking up and releasing the work pieces the vacuum cylinder 56 and its associated mechanism is not used although it is left on the machine, as shown in Figure 22, and functions merely as a guide for the work piece pickup platform as it is raised and lowered by the mechanism operated by the vacuum cylinder 50.

In Figures 24, 25 and 26 there is shown a vacuum work piece pickup and release means which may be employed in place of the movable jaw blocks previously described. The pickup and release of the work pieces in this case are effected by a vacuum cup 177 which is mounted in a supporting plate 178 secured to the lift platform walls 115 and 116. The vacuum cup 177 is connected directly by conduit 179 to the vacuum valve M and when it is used the vacuum cylinder 56 and conduit 24 are disconnected from said valve M and vacuum cylinder 56 is used merely as a guide for the pickup platform as it is raised and lowered by the operation of vacuum cylinder 50. Also when the vacuum cup 177 is used, the mechanism adapted to be operated by vacuum cylinder 56 may be eliminated from the machine.

By means of the mechanism described above it will be seen that I have provided a novel and efficient machine for transferring work pieces from a predetermined station located at a point remote from the die of a power press, to the press, and which is provided with numerous means for permitting a wide range of adjustment of the several mechanisms thereof and so that the machine may be made adaptable to function in conjunction with the mechanisms of different types of presses and so that it will handle different sizes and shapes of work pieces. Also the machine incorporates therein an electrical switch means which effect the operation of the power press at predetermined timed intervals as work pieces are fed to it and an electrical switch means for automatically shutting off the operation of the power press in case of an obstruction to the action of the feed are at the die of the press. Thus there is provided complete safety to the operator of the machine if he has to remove a work piece which has been improperly fed to the power press. In addition to the above features the machine is provided with novel means for picking up and depositing the work pieces which are fed to the power press. Such means may consist of gripping fingers operated by the piston of a vacuum cylinder connected to a vacuum pump, or of a magnetic means, or of a vacuum means.

Although the machine of the invention has been disclosed as used for feeding work pieces to a power press, it is obvious that it could also be employed in conjunction with other types of machines where secondary operations or sub-assembly work is to be performed on work pieces fed to the same. Therefore, the invention is not to be restricted to a use with respect to a power press only.

What is claimed is:

1. In an automatic work feed to a work forming station of a machine tool, a work transfer means; a work piece pick up and depositing device carried by said transfer means; mechanism on said transfer means for reciprocating said work piece pick up and depositing mechanism from and toward said transfer means; mechanism for actuating said last named mechanism and said workpiece pick-up and depositing device and for moving said transfer means toward and from the work forming station at predetermined timed intervals and in synchronism with operation of the machine tool; and means mounted on said transfer means responsive to an obstruction to the movement of said work piece pick-up and depositing mechanism from said transfer means at the work forming station to interrupt operation of the machine tool.

2. A machine for feeding work pieces to the die of a punch press comprising means for picking up the work pieces at a point remote from the press and feeding the same to the die of the press, the operation of said means being effected by means controlled by the operation of a vacuum pump, an arm for oscillating said work piece pick up and feeding means towards and away from the die of the press, means for imparting an oscillating movement to said arm at predetermined timed intervals, means operated by said last mentioned means for effecting the operation of said vacuum pump at the end points of the oscillating movements imparted to said arm, means mounted on said arm and operated by said vacuum pump for lowering and raising said work piece pick up and feeding means at the end points of the oscillating movements imparted to said arm to position the same for picking up and feeding the work pieces, and means operated by said oscillating means for effecting the operation of the punch press mechanism in timed relation to the oscillating movements imparted to said arm.

3. A machine for feeding work pieces to the die of a punch press comprising a magnetic means for effecting the pick up and the feeding of work pieces to the die of the press, the operation of said magnetic means being controlled by an electrical circuit, a transfer means for oscillating said magnetic pick up and feeding means towards and away from the die of the press, a drive means for imparting an oscillating movement to said transfer means at predetermined timed intervals, means operated by said drive means for opening and closing said electrical circuit in timed relation to the oscillating movements imparted to said transfer means, a vacuum cylinder mounted on said transfer means, means operated by said vacuum cylinder for causing said magnetic means to be lowered and raised at the end points of the oscillating movements imparted to said transfer means for positioning the same to effect the pick up and the feeding of the work pieces, a vacuum pump for applying vacuum to said cylinder, a valve means operated by said drive means for controlling the vacuum applied to said cylinder by said pump, and means operated by said drive means for effecting the operation of the punch press in timed relation to the oscillating movements imparted to said transfer means.

4. A machine for feeding work pieces to the die of a punch press comprising a vacuum means for effecting the pick up and the feeding of the work pieces to the die of the press, the operation of said vacuum means being controlled by the operation of a vacuum pump, a transfer means for moving said vacuum means towards and away from the die of the press, drive means for imparting an oscillating movement to said transfer means at predetermined timed intervals, means operated by said drive means for effecting the operation of said vacuum pump at the end points of the oscillating movements imparted to said transfer means, means mounted on said transfer means and operated by said vacuum pump for lowering and raising said vacuum means at the end points of the oscillating movements imparted to said transfer means to position the same for picking up and depositing the work pieces, and means operated by said drive means for effecting the operation of the mechanism of the punch press in synchronism with the oscillating movements imparted to said transfer means.

5. A machine for feeding work pieces to the die of a punch press, comprising means for picking up the work pieces and feeding the same to the die of the press, the operation of said means being effected by means controlled by the operation of a vacuum pump, a transfer means for oscillating said work piece pick up and depositing means towards and away from the die of the press, means for oscillating said transfer means at predetermined timed intervals, means for effecting the operation of said vacuum pump in timed relation to the movements imparted to said transfer means, means mounted on said transfer means operated by said vacuum pump for lowering and raising said work pick up and feeding means at the end points of the oscillation of said transfer means to position the same for picking up and feeding the work pieces, means operating the mechanism of the punch press in timed relation to said oscillating movements imparted to said transfer means.

6. A machine for feeding work pieces to the die of a punch press comprising means for picking up the work pieces and feeding the same to the die of the press, the operation of said means being effected by mechanism controlled by the operation of a vacuum pump, a transfer means for oscillating said work piece pick up and feeding means towards and away from the die of the press, means controlled by the operation of the vacuum pump for causing said work piece pick up and depositing means to be lowered and raised with respect to said transfer means to position the same for picking up and feeding the work pieces, means for effecting the oscillation of said transfer means at predetermined timed intervals and for effecting the operation of said vacuum pump at the end points of the oscillations imparted to said transfer means, and an electrical switch operated by said operating means for said transfer means for controlling an electrical circuit adapted to effect the operation of the punch press, and means mounted on said transfer means and operable by the movements imparted to said transfer means for causing an electrical circuit to interrupt the operation of the mechanism of the punch press in case of an obstruction to deposit of a work piece at the die of the press.

7. A machine for feeding work pieces to the die of a punch press comprising means for picking up work pieces and feeding the same to the die of the press, the operation of said means being effected by mechanism controlled by the operation of a vacuum pump, a transfer arm for oscillating said work piece pick up and feeding means towards and away from the die of the press, means for effecting the operation of said transfer arm at predetermined timed intervals, means controlled by the operation of a vacuum cylinder connected to said vacuum pump for causing said work piece pick up and depositing means to be lowered and raised with respect to said transfer arm to position the same for picking up and feeding the work pieces, means for effecting the operation of said vacuum pump at the end points of the oscillations imparted to said transfer arm, and electrical means operated by said arm operating means for causing the mechanism of the punch press to be operated in timed relation with the movements imparted to said arm.

8. A machine for feeding work pieces to the die of a punch press comprising means for picking up work pieces at a predetermined point remote from the press and transferring the same to the die of the press, a transfer arm for moving said work piece pick up and transfer means towards and from the die of the press, means for oscillating said transfer arm towards and from the die at predetermined timed intervals, a vacuum means mounted on said transfer arm for effecting the lowering and raising of said work piece pick up and depositing means with respect to said transfer arm to position the same for effecting the pick up and transfer of the work pieces, a second vacuum means mounted on said transfer arm for effecting the operation of said work piece pick up and transfer means, means for producing a vacuum in said vacuum means at predetermined timed intervals during the oscillating movements of said transfer arm, and means operated by said transfer arm operating means for effecting the operation of the punch press in timed relation to the movements imparted to said transfer arm.

9. A machine for feeding work pieces to the die of a punch press comprising a work piece pick up and transfer means, a transfer arm for moving said work piece pick up and transfer means towards and away from the die of the press, means for causing said transfer arm to be oscillated towards and from the die of the press at predetermined timed intervals, a vacuum cylinder mounted on said transfer arm provided with means for effecting the lowering and raising of said work piece pick up and transfer means with respect to said transfer arm, a second vacuum cylinder mounted on said transfer arm provided with means for effecting the operation of said work piece pick up and transfer means, a valve means for controlling the vacuum applied to said cylinders, and means operated by said transfer arm oscillating means for operating said valve means at predetermined timed intervals and for operating means to effect the operation of the punch press in timed relation to the movements imparted to said transfer arm.

10. A machine for feeding work pieces to the die of a punch press comprising means for picking up the work pieces and feeding the same to the die of the press consisting of a pair of work piece grasping members, a transfer means for oscillating said grasping members towards and away from the die of the press, means for effecting the operation of said grasping members, a vacuum cylinder having means for effecting the operation of said last mentioned means, means for causing said grasping members to be lowered and raised with respect to said transfer means to position the same for grasping and depositing the work pieces, a second vacuum cylinder having means for effecting the operation of said last mentioned means, means for applying a vacuum to each of said vacuum cylinders, a valve means for controlling the vacuum applied to each of said vacuum cylinders, means for oscillating said transfer means at predetermined timed intervals and for operating said valve means at the end points of the movements imparted to said transfer means, and means operated by said last mentioned means for causing the punch press to be operated in timed relation to the movements imparted to said transfer means.

11. A machine for feeding work pieces to the die of a punch press comprising a vacuum means for effecting the picking up of the work pieces and feeding the same to the die of the press, a transfer means for oscillating said vacuum means towards and away from the die of the press, means for causing said vacuum means to be lowered and raised with respect to said transfer means to position the same for picking up the work pieces and feeding the same to the die, a second vacuum means for effecting the operation of said last mentioned means, means for applying a vacuum to each of said vacuum means, a valve means for controlling the vacuum applied to each of said vacuum means, means for oscillating said transfer means at predetermined timed intervals and for effecting the operation of said valve means at the end points of the movements imparted to said transfer means, and means operated by said last mentioned means for causing the punch press to be operated in timed relation to the movements imparted to said transfer means.

12. A machine for feeding work pieces to the die of a punch press comprising a magnetic means for picking up the work pieces and depositing the same on the die of the press, an electrical circuit for controlling the operation of said magnetic means, means for oscillating said magnetic means towards and away from the die of the press, means for raising and lowering the magnetic means at the end points of the oscillating movements imparted thereto to position the same for picking up and depositing the work pieces, a vacuum means for effecting the operation of said last mentioned means, means for applying a vacuum to said vacuum means, a valve means for controlling the vacuum applied to said vacuum means, means for effecting the operation of said oscillating means, said electrical circuit, and said valve means in timed relation to each other, and means for effecting the operation of the punch press in synchronism to the movements imparted to said oscillating means.

13. In an automatic feed for work pieces to a machine tool; a work transfer arm; a work piece gripping device movably mounted on said arm; mechanism on said arm for actuating said work piece gripping device; mechanism on said arm operable to lower and raise said work piece gripping device relative to said arm; control mechanism for actuating said above named mechanisms and for oscillating said arm toward and from the work forming station at predetermined timed intervals and in synchronism with operation of the machine tool, and safety mechanism mounted on said arm responsive to an obstruction to the downward feeding movement of said gripping device lowering and raising mechanism to interrupt operation of the machine tool.

14. In a machine for feeding work pieces to the die of a punch press, means for picking up the work pieces from a point remote from the press and depositing the same on the die of the press, said means including a pair of work piece grasping members, a transfer means for oscillating said work piece pick up means towards and from the point of pick up to the die of the press, means for operating said grasping members comprising a vacuum cylinder mounted on said transfer means and provided with means for causing said grasping members to be drawn together when a vacuum is produced in the cylinder and means for urging the said grasping members apart when the vacuum in said cylinder is broken, means for causing said work piece pick up and depositing means to be lowered and raised with respect to said transfer means, at the work piece pick up point and at the die of the press to pick up and deposit the work pieces, a second vacuum cylinder mounted on said transfer means for effecting the operation of said last mentioned means at the end points of the oscillation of said transfer means, means for applying a vacuum to each of said cylinders, a valve means for controlling the vacuum applied to said cylinders, means for oscillating said transfer means between the work piece pick up point and the die of the press at predetermined timed intervals and for effecting the operation of the valve means at the end points of the oscillating movements imparted to said transfer means, and means operated by said last mentioned means for causing the punch press to be operated in timed relation to the movements imparted to said transfer means.

15. In a machine for feeding work pieces to the die of a punch press, means for picking up the work pieces from a point remote from the press and depositing the same on the die of the press, a transfer means for moving said work piece pick up and depositing means from the point of pick up to the die of the press, a vacuum cylinder mounted on said transfer means, means for effecting the operation of the work piece pick up and depositing means the operation of which is controlled by vacuum applied to said cylinder, means associated with the operating means for said work pick up and depositing means for causing the interruption of operation of the punch press in case of an obstruction to deposit of a work piece at the die of the press, a second vacuum cylinder mounted on said transfer means, means for causing said work piece pick up and depositing means to be lowered and raised with respect to said transfer means at the work pick up point and at the die of the press the operation of which is controlled by vacuum applied to said second mentioned cylinder, means for applying a vacuum to said cylinders, a valve means operated by the operating means for said transfer means for controlling the vacuum applied to said cylinders by said vacuum applying means, means for effecting the operation of the punch press operated by the operating means for said transfer means, the operation of the transfer means, the operation of the valve means, and the operation of the punch press operating means being effected in timed relation to each other.

16. An automatic feed for work pieces to the work forming station of a machine tool comprising a transfer arm horizontally oscillatable toward and from said station; work grasping and releasing mechanism carried by said arm; mechanism including a drive shaft for oscillating said transfer arm at predetermined timed intervals synchronized with operation of the machine tool; fluid pressure actuated mechanism operatively connected to said work grasping and releasing mechanism; a valve for controlling said fluid pressure operated mechanism comprising coacting stationary and movable valve members actuated by said drive shaft to operate said work grasping and releasing means at the end points of the oscillating movement of said transfer arm; and mechanism operatively controlled by said valve and carried by the transfer arm for moving said work grasping and releasing mechanism vertically with respect to the transfer arm at the ends of the oscillating movements of said arm.

17. A machine for feeding work pieces to the work forming station of a machine tool comprising a vacuum means for effecting the pickup and feeding of the work pieces to the work forming station of the machine tool, the operation of said vacuum means being controlled by the operation of a vacuum pump, a transfer means for moving said vacuum means toward and away from the work forming station of the machine tool, drive means for imparting movement to said transfer means at predetermined timed intervals, means operated by said drive means for effecting the operation of said vacuum pump at the end points of the movements imparted to said transfer means, and means for reciprocating said vacuum means from and toward said transfer means at the end points of the movement imparted to said transfer means to position the same for picking up and depositing the work pieces.

RICHARD V. HELLER.

REFERENCES CITED

The following references are of record in the file of this patent:

UNITED STATES PATENTS

| Number | Name | Date |
| --- | --- | --- |
| 616,213 | Tyden | Dec. 20, 1898 |
| 1,288,316 | Walsh | Dec. 17, 1918 |
| 1,719,568 | Spies | July 2, 1929 |
| 1,779,641 | Rockwood | Oct. 28, 1930 |
| 1,874,804 | Reese | Aug. 30, 1932 |
| 2,021,077 | Merrill | Nov. 12, 1935 |
| 2,130,235 | Heyman | Sept. 13, 1938 |
| 2,322,294 | Heyman | June 22, 1943 |
| 2,360,906 | Smith | Oct. 24, 1944 |